United States Patent [19]

Narkon

[11] 4,280,721
[45] Jul. 28, 1981

[54] ANGULARLY LOCKABLE FITTING

[75] Inventor: Norman W. Narkon, Manchester, Conn.

[73] Assignee: United Technologies Corporation, Hartford, Conn.

[21] Appl. No.: 94,254

[22] Filed: Nov. 14, 1979

[51] Int. Cl.³ .............................................. F16L 43/00
[52] U.S. Cl. .................................... 285/179; 285/184; 285/212
[58] Field of Search ............... 285/179, 184, 211, 212, 285/220, 181

[56] References Cited

U.S. PATENT DOCUMENTS

| 1,605,507 | 11/1926 | Burke | 285/181 X |
| 1,908,598 | 5/1933 | Gollong et al. | 285/181 |
| 2,893,756 | 7/1959 | Sundstrom | 285/220 X |
| 2,926,935 | 3/1960 | La Marre | 285/184 X |
| 3,376,053 | 4/1968 | Novokovich et al. | 285/212 X |

Primary Examiner—Dave W. Arola
Attorney, Agent, or Firm—Norman Friedland

[57] ABSTRACT

This invention relates to fittings for a pipe adapted for interconnecting a gas turbine engine and its fuel control where the fitting has a swivel connection for simple angular alignment and a friction plate locking the fitting and characterized as having a low profile, a simple two-bolt connection and good sealing.

6 Claims, 2 Drawing Figures

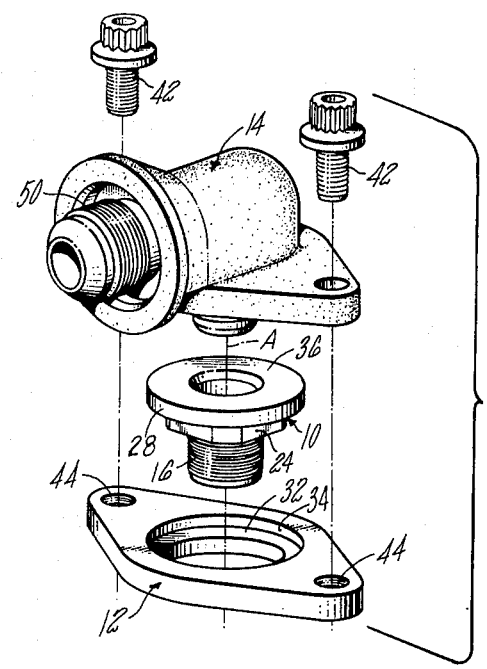
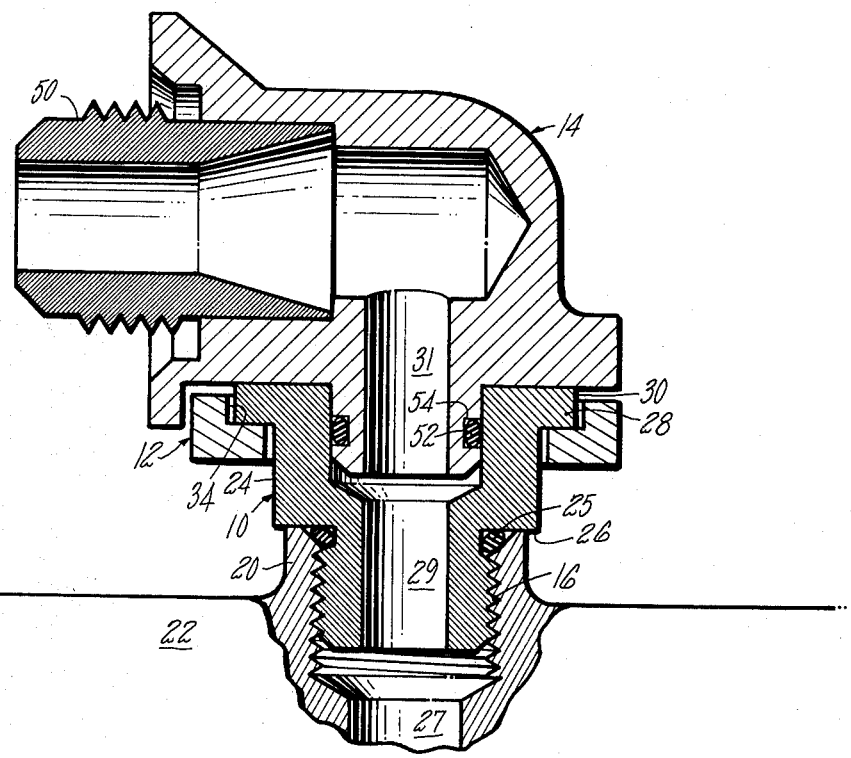

ANGULARLY LOCKABLE FITTING

BACKGROUND OF THE INVENTION

This invention relates to fittings particularly adapted to interconnect the plumbing for a gas turbine engine and its fuel control and particularly to means for angular movement of its elbow for ease of installation.

As is well known in the turbine engine art, size and weight are of paramount importance and it generally is essential to keep them at a minimum. Heretofore, the non-flexible type tubing interconnecting the jet engine and its fuel control required a positioning type or bulkhead fitting which not only required more room than the fitting of this invention but because of their nature had to be carefully installed and precisely adjusted so as not to extrude or damage the cooperating O-ring seal. In the bulkhead type, once the male portion was aligned with the female portion of the connection, a nut had to be torqued which compressed the O-ring seal. Torquing the nut, if the parts were not exactly aligned, the O-ring could be extruded or damaged. The space required to accommodate the O-ring made disassembly difficult.

We have found that in addition to solving the problems noted above the swivel fitting made in accordance with this invention provides greater positioning flexibility than heretofore known fittings as well as improves sealing.

It is contemplated that this swivel fitting carries an adapter with a complimentary O-ring seal that is designed to thread into a boss formed on the fuel control casing. This permits the associated swivel elbow and collar to be readily positioned without disturbing the boss seal.

Additionally, I have found that by virtue of this invention the height from the boss face to the tip of the swivel fitting is less than the corresponding height of the heretofore known positioning type fitting. In certain installations it was found that these fittings permitted fuel control removal which was not readily obtainable heretofore. Hence, by positioning the swivel for allowing elbow removal, the fuel control and its pump could easily be removed from the engine, leaving the tubes in the installed position.

SUMMARY OF THE INVENTION

An object of this invention is to provide an improved fitting that is frictionally secured and has swivel movement upon loosening two set screws.

A still further object of this invention is to provide a swivel fitting as described that is adaptable for use for interconnecting the tubing of a jet engine and its control that is characterized as having improved sealing and positioning flexibility.

Other features and advantages will be apparent from the specification and claims and from the accompanying drawings which illustrate an embodiment of the invention.

BRIEF DESCRIPTION OF THE DRAWING

FIG. 1 is an exploded perspective view showing the details of the invention.

FIG. 2 is a cross sectional view of the assembled components of FIG. 1.

DESCRIPTION OF THE PREFERRED EMBODIMENT

While this invention is described in its preferred embodiment as being utilized for connecting plumbing in a jet engine application, as one skilled in the art will appreciate, this fitting is intended to have universal application.

As noted in FIGS. 1 and 2, the swivel fitting essentially comprises an adapter 10, collar 12 and elbow 14. Adapter 10 has a threaded surface 16 for threadably engaging mating threads in boss 20 formed in a fuel control casing 22 (only partially shown). Wrench flats 24 formed around the circumference of adapter 10 serves to accommodate a wrench for torquing down the adapter into the fuel control casing. An O-ring 25 is located adjacent shoulder 26 formed between threaded surface 16 and flats 24 and serves to seal around the passage 27 formed in the full control casing, aligned with the passage 29 in adapter 10 and passage 31 in elbow 14. As noted, adapter 10 carries on its upper end annular flange 28 and defining a relatively square shoulder 30. Collar 12 has formed at its upper end recess 32 that extends partway down and it defines a complimentary square shoulder 34.

As is readily apparent from FIG. 2, the depth of recess 32 and the height of flange 28 is such that in the assembled condition the height of flange 28 is greater than the depth of recess 32 so that the top face 36 of flange 28 extends above the recess 32. The surface of top face 36 is planar and bears against a complimentary planar face 38 formed on the bottom of elbow 14.

Hence, when elbow 14 is assembled and secured by threadably engaging bolts 42 (only two being necessary) to the mating threads 44 formed in collar 12 the two surfaces 36 and 38 are placed in metal-to-metal contact and torquing down on bolts 42 frictionally locks the elbow to the adapter. The outer diameter of adapter 10 is cylindrically shaped and the wider diameter flange 28 at the top end serves as a journal bearing that rides in the cylindrically shaped dimension of recess 32. Therefore, when bolts 42 are retracted sufficiently to relieve the frictional forces the collar 12 and the elbow 14, still attached by virtue of the loose attachment, will rotate about the central axis A and flange 28 acts as a bearing in recess 32 which acts as its journal. This allows the pipe connection 50 suitably attached to elbow 14 as by brazing, to have 360° angular movement in the horizontal plane, allowing easy alignment with the mating plumbing, which in an engine installation remains fairly rigid.

A second O-ring 52 is carried in groove 54 formed in the depending leg of elbow 14 to avoid leakage internally of adapter 16.

As shown, the elbow and male threaded fitting 50 are intended for a coaxial type plumbing and it is to be understood that the elbow and the attendant fitting can be adapted for other types of connectors, as for example a conventional single wall plumbing.

It should be understood that the invention is not limited to the particular embodiments shown and described herein, but that various changes and modifications may be made without departing from the spirit and scope of this novel concept as defined by the following claims.

I claim:

1. A fitting including an elbow adapted to connect to plumbing and rotatable about a central axis for alignment with the mating end of said plumbing, an adapter secured to a casing internally communicating with said plumbing, said adapter having a cylindrical body and a larger diameter cylindrical portion at its upper end extending beyond said body, said cylindrical portion having a top planar surface, the bottom of said elbow having a complimentary planar surface lying normal to said central axis, a collar having a recess having a bottom wall receiving said cylindrical portion and in rotating relation therewith, said elbow having an integral radially extending flange lying in the same plane as said complimentary planar surface complimenting said collar, means for retractably securing said flange to said collar so that said top planar surface and said complimentary planar surface are placed into contact to frictionally lock said elbow to said adapter and the bottom surface of said cylindrical portion bearing against said bottom wall such that said top planar surface of said larger diameter cylindrical portion projects above said recess.

2. A fitting as in claim 1 wherein said adapter has a threaded surface at its lower end engaging mating threads in said casing, a shoulder formed adjacent said threaded surface extending beyond but bearing against said casing, and an O-ring seal between said shoulder and said threaded surface.

3. A fitting as in claim 2, wherein said elbow has a lower leg portion extending into a central bore formed in the top end of said adapter, an O-ring mounted in said leg portion bearing against the side wall of said bore.

4. A fitting as in claim 1 wherein flats are formed to said cylindrical body for engaging a torquing wrench and said flats being located below said larger diameter cylindrical portion and adjacent said shoulder.

5. A fitting as in claim 4 wherein said side wall of said recess and the side wall of said larger diameter cylindrical portion are in journal bearing relationship.

6. A fitting as in claim 5 wherein said retractably securing means are a pair of bolts threadably secured to oppositely threaded apertures in said collar.

* * * * *